United States Patent
Tanaka

[11] Patent Number: 5,837,366
[45] Date of Patent: Nov. 17, 1998

[54] STRIPPING FINGERS FOR COPYING MACHINES AND PRINTERS

[75] Inventor: Mitsuru Tanaka, Mie, Japan

[73] Assignee: NTN Corporation, Osaka, Japan

[21] Appl. No.: 889,735

[22] Filed: Jul. 8, 1997

[30] Foreign Application Priority Data

Jul. 8, 1996 [JP] Japan .................................. 8-177672

[51] Int. Cl.⁶ .............................. B32B 5/16; B36H 29/54
[52] U.S. Cl. ........................ 428/327; 271/307; 271/310; 428/292.1; 428/325; 428/328; 428/330
[58] Field of Search .............. 428/292.1, 299.4, 428/212, 327, 325, 328, 330, 421; 271/307, 310

[56] References Cited

U.S. PATENT DOCUMENTS

| | | | |
|---|---|---|---|
| 4,806,985 | 2/1989 | Foley et al. | 355/3 SH |
| 4,929,983 | 5/1990 | Barton et al. | 355/315 |
| 5,160,130 | 11/1992 | Fromm et al. | 271/307 |
| 5,364,670 | 11/1994 | Satoji et al. | 428/1 |
| 5,518,781 | 5/1996 | Nakamura et al. | 428/1 |
| 5,617,197 | 4/1997 | Kawabata et al. | 399/398 |

FOREIGN PATENT DOCUMENTS

| | | |
|---|---|---|
| 54-97042 | 7/1979 | Japan . |
| 61-60756 | 3/1986 | Japan . |
| 2-28675 | 1/1990 | Japan . |
| 2-247678 | 10/1990 | Japan . |
| 3-184074 | 8/1991 | Japan . |
| 4-213476 | 8/1992 | Japan . |
| 7-40157 | 5/1995 | Japan . |
| 7-230230 | 8/1995 | Japan . |
| 2561919 | 9/1996 | Japan . |

*Primary Examiner*—H. Thi Le
*Attorney, Agent, or Firm*—Wenderoth, Lind & Ponack, LLP

[57] ABSTRACT

A stripping finger for a copier having a tip acutely arcuated with extremely high precision and less likely to be deformed when heated or collided repeatedly with a roller, and capable of stably maintaining high paper stripping ability, as well as high lubricity and non-tackiness at the surface for a long time. The stripping finger is formed from a polyphenylene sulfide resin composition containing 40–70 wt % of a polyphenylene sulfide resin having a melt viscosity of 3000 poise or over at 315° C., 18–30 wt % of a polytetrafluoroethylene having an average particle diameter of 1–5 $\mu$m, 2–7 wt % of a polyolefin, such as a high-density polyethylene having a specific gravity of 0.942 g/cm³, and 10–40 wt % of a fibrous reinforcing material.

16 Claims, 4 Drawing Sheets

STRIPPING FINGERS FOR COPYING MACHINES AND PRINTERS

BACKGROUND OF THE INVENTION

This invention relates to a stripping finger used on copying machines and printers.

Most copying machines and printers have a sensitizing device for adhering toner to statically charged latent images formed on the surface of a photosensitive drum and transferring the toner images onto copy paper, and an image fixing device for fusing the toner to the paper by heating the paper.

The sensitizing device forms charged images identical to original images on the rotating photosensitive drum, and transfers these images onto copy paper. During image transfer, the photosensitive drum is pressed against the paper. Since the drum and paper adhere to each other by static energy produced when the images are charged, the paper has to be stripped from the photosensitive drum with stripping fingers after the images have been transferred onto the paper.

The fixing device includes a fixing roller with a heater and a pressure roller pressed against the fixing roller. Sheets such as transfer paper, which carry unfixed toner images, are passed between these rollers to fix the toner images. The sheets are then stripped from the fixing rollers and the pressure rollers by means of stripping fingers.

As shown in FIGS. 4 and 5, image forming devices that utilize electrophotographic process to form images, such as electrophotographic copiers and laser printers, transfer the images formed on photosensitve material onto transfer paper, fix the transferred images on the paper in an image fixing unit, and discharge the transfer paper.

Toner images transferred onto transfer paper are heat-fused and fixed to the transfer paper by passing the paper through a nip portion between an image-fixing roller with a built-in heater and a press roller pressed against the image-fixing roller in the image fixing unit. The paper is then discharged from the image former by paper discharge rollers.

FIG. 4 schematically shows a conventional image fixing unit of this type. It comprises an image-fixing roller 10 with a built-in heater 9 and a press roller 11 pressed against and rotated by the roller 10 with transfer paper sandwiched between the rollers 10 and 11. Transfer paper 7 fed from an unillustrated image transfer unit by a conveyor belt 6 and carrying unfixed toner images is inserted into a nip portion between the fixing roller 10 and the press roller 11 and fed therethrough. While being fed between the rollers 10 and 11, the toner images are fixed to the transfer paper. The paper 7 that has passed between the rollers 10 and 11 is separated from the fixing roller 10 by a stripping finger 12 provided downstream of the fixing roller 10.

Paper stripped from the fixing roller 10 is fed through the paper feed path while passing between a driving paper discharge roller 14 and a driven paper discharge roller 13 pressed against the roller 14, and discharged from the machine.

For a color laser printer shown in FIG. 5, transfer paper carrying an unfixed toner image is fed between a fixing roller 10 with a built-in heater and a pressure roller 11 pressed against the roller 10, stripped from the fixing roller 10 by stripping fingers 12, fed between paper discharge rollers 13, 14, between a pair of intermediate guide rollers 15, and between a driving roller 16 and a kick roller 17, and discharged from the machine. The numeral 12a denotes a stripping finger for the pressure roller 11.

Each stripping finger has a pointed tip having an acute angle of about 30° with a roller contact width of 2–5 mm if brought into sliding contact with a fixing roller and 3–15 mm if brought into sliding contact with a pressure roller or a photosensitive drum. One of the two sides forming the acute angle is pressed against the surface of the fixing roller at a certain angle, while the other side is used to scrape up paper and guide it rearwardly of the finger tip. Paper is thus smoothly stripped from the roller. In order for stripping fingers to perform this function smoothly and reliably, it is required that their finger tips be curved very acutely with a radius of curvature (R) of 0.1 mm or under, preferably 0.05 mm or under.

Stripping fingers have to be sufficiently low in tackiness so that toner will not stick to finger tips. This is because if toner sticks to the tip of a finger, its radius of curvature at finger tip will change, making it impossible to strip paper, or scraping toner fused to the paper and leaving white streaks of scratch marks on the paper on which images have been fixed.

Moreover, stripping fingers have to be sufficiently low in friction coefficient to prevent clogging of transfer paper by smoothly scraping paper by finger tips. For this purpose, the stripping fingers have to have self-lubricity, or otherwise they have to be lubricated by a solid lubricant.

One important requirement for today's copiers, LBP's, facsimiles, etc. is a shorter processing time. In order to shorten the processing time, it is necessary to increase the printing speed and thus the image fixing temperature (to about 250° C.). The ambient temperature at the fixing unit of such a high-speed device is ordinarily 150°–300° C., but can reach to 250°–350° C.

Also, since heat produced by the heaters is conducted to the pressure roller through the fixing roller, stripping fingers have to be heat-resistant enough not to be deformed or degraded at high temperatures of 150° C. or over, preferably 200° C. or over if the stripping fingers are used in the fixing device.

Conventional stripping fingers that are low in tackiness and friction coefficient to some extent are made from a composition comprising, as a main component, a heat-resistant resin such as polyimide, polyamideimide, polyarylene sulfide, aromatic polyetherketone, aromatic polysulfone, aromatic polyetherimide, aromatic polyamide and aromatic polyester, and a tetrafluoroethylene resin or a solid lubricant such as graphite.

But it is difficult to form a sharp finger tip with high accuracy from such a heat-resistant resin containing a solid lubricant, particularly by injection-molding.

Even if the finger tip can be molded into a desired shape with high accuracy, it is liable to be deformed by heat in use and by repeatedly colliding with a roller. A stripping finger with a deformed tip cannot strip paper reliably from the fixing roller.

Even if a non-tacky film is formed on the tip of the stripping finger to improve lubricity and non-tackiness, such a film will soon wear. Thus, such a film cannot maintain good lubricity and low tackiness of the stripping finger stably for a long time.

An object of this invention is to provide a stripping finger for a copying machine having a precisely shaped, acutely curved tip which is less likely to be deformed by heat or repeated collision with a roller, which can strip paper reliably from a roller, and which can maintain good lubricity and low tackiness stably for a long time.

Another object of this invention is to form a stripping finger having a precisely shaped, acutely curved tip by injection molding.

SUMMARY OF THE INVENTION

According to this invention, there is provided a stripping finger molded from a polyphenilene sulfide resin composition comprising 40–70 wt % of polyphenylene sulfide resin (hereinafter affreviated to PPS resin), 18–30 wt % of polytetrafluoroethylene (hereinafter abbreviated to PTFE) having an average particle diameter of 1–5 μm, 2–7 wt % of polyolefin resin, and 10–40 wt % of a fibrous reinforcing material.

The abovementioned second object is achievable by selecting, as the PPS resin, a PPS resin having a melt viscosity at 315° C. of 3000 poise or over.

The PPS resin as the main component and a predetermined amount of the fibrous reinforcing material in the resin composition improve the heat resistance and shock resistance of the finger tip. Further, the PPS resin has an inherently good melt moldability, and the composition can be molded efficiently by injection molding.

The polytetrafluoroethylene having the predetermined particle diameter and the polyolefin added to the resin composition in the predetermined proportions serve to maintain good lubricity and low tackiness of the stripping finger stably for a long time without impairing good moldablity inherent to the PPS resin.

Other features and objects of the present invention will become apparent from the following description made with reference to the accompanying drawings, in which:

DETAILED DESCRIPTION OF THE PREFERRED EMBODIMENT

Figure 1:
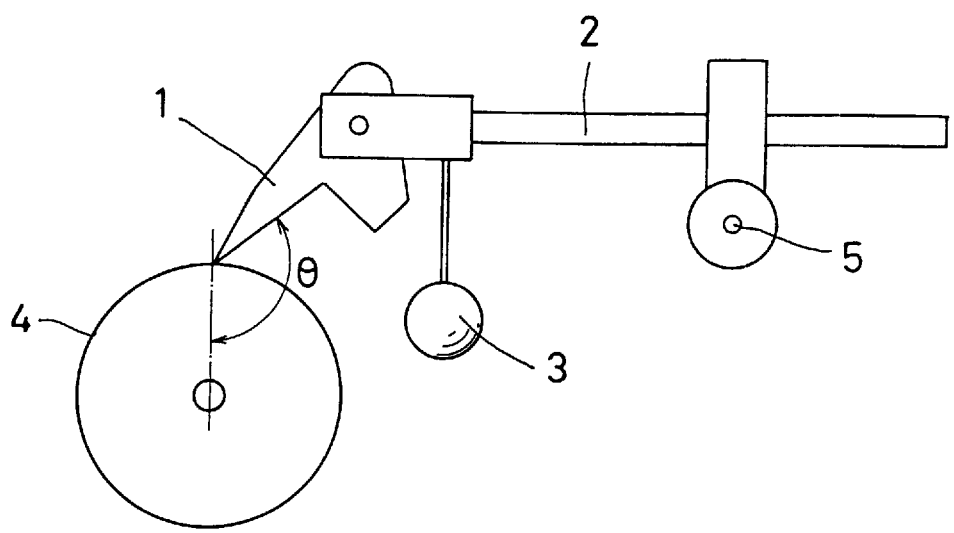
FIG. 1 is a schematic side view of a thermal deformation tester for measuring thermal deformation of a stripping finger at its tip.

The PPS resin used in this invention preferably contains 70 mol % or more, more preferably 90 mol % or more of units represented by Formula 1 below.

A preferable PPS resin used in this invention is one containing 70–100 mol %, more preferably 90–100 mol %, of building units shown by Formula 1 below. Such a PPS resin is highly crystallizable and thus shows high heat resistance, flame resistance, mechanical strength and dimensional stability, and good sliding properties. Such a PPS resin has a maximum crystallinity index of at least 30% or over, more preferably 50–75%, and most preferably 60–65%. Also, such a PPS resin has a limit oxygen index of preferably 40–60%, more preferably 44–53%. The degree of flame retardancy of such a PPS resin is preferably V-O under UL94. Its preferable water absorption is 0.5% or less. Also, a PPS having a high dimensional stability is preferable.

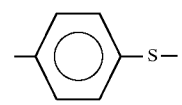
[Formula 1]

The PPS may also contain units represented by the following Formula 2 (m-phenylene sulfide units, O-phenylene sulfide units, phenylene sulfide sulfone units, phenylene sulfide ketone units, phenylene sulfide ether unit, or diphenylene sulfide units), and units represented by Formula 3 (phenylene sulfide units containing various functional groups). The content of such various units (which may be copolymer units) should be 30 mol % or under, preferably 10 mol % or under. If their content is over 30 mol %, the crystallinity of the PPS resin having units expressed by Formula 1 as a main component may not increase sufficiently, its moldability may deteriorate, its heat resistance may drop, and/or the homogeneity of the PPS resin composition may be lost.

[Formula 2]
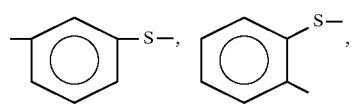
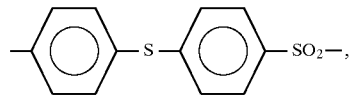
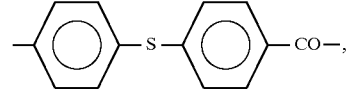
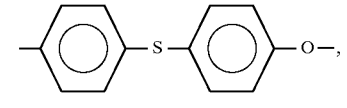
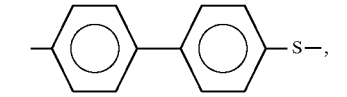

[Formula 3]
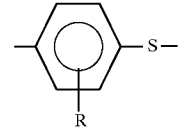

(wherein R is alkyl, phenyl, nitro, carboxyl, nitrile, amino, alkoxyl, hydroxyl or sulfonic groups)

The PPS resin may be a straight-chain polymerized resin. It may have the degree of polymerization increased by heating in an oxygen atmosphere or by adding peroxides and heating, or heating in a non-oxidizing inert gas atmosphere. Also, the PPS resin used in this invention may be a mixture of such PPS resins, or one which has been subjected to deionizing treatment (such as acid washing or boiling water treatment) to reduce ions.

The PPS resin used in this invention may be in any polymerization form including straight-chain, crosslinked and half-crosslinked type.

The PPS resin used in this invention has a melt viscosity of 3000 poise or over as measured with a capillary rheometer using a die 1 mm diameter and 2 mm long at 315° C. under load of 10 kg. If the melt viscosity thus measured is less than 3000 poise, a large amount of molten resin will flow or drool out of the injection-molding cylinder during injection molding. In order to form a finger tip with an accurate curvature by injection molding without causing drooling of resin, the melt viscosity of the PPS resin has to be 3000–25000 poise, preferably 3000–20000 poise. If the melt viscosity is too high, resistance will increase during injection-molding, thus worsening moldablility. If this resistance is too large, it may be impossible to mold a stripping finger. Thus, most preferably, the PPS resin has a melt viscosity of 4000–10000 poise.

The content of the PPS resin as the main component in the PPS resin composition according to this invention should be 40–70 wt %, preferably 50–70 wt %. If its content is less than 40 wt %, the stripping finger formed will be too low in heat resistance and shock resistance. If over 70 wt %, excessive drooling of resin will occur during molding. Most preferably, the content of PPS resin in the composition should be 50–60 wt %, because such a composition has high heat resistance and shock resistance and good moldability.

The PTFE used in this invention should have an average particle diameter of 1–5 μm. PTFE having an average particle diameter smaller than 1 μm or larger than 5 μm will increase tackiness of the stripping finger, which means that the toner is more likely to adhere to the stripping finger. If the average particle diameter of PTFE is 2–4 μm, the tackiness of the finger is the lowest.

According to this invention, better results are expected by using, instead of a virgin PTFE, a recycled PTFE having an average particle diameter within the above-described range. Recycled PTFE is a powder obtained by calcining and pulverzing a virgin material. Less likely to become fibrous, a recyled PTFE, as added to a resin composition, will not increase the melt viscosity of the resin composition so markedly, and thus will not impair injection moldability of the resin. Also, since recycled PTFE is calcined, a resin composition containing such recycled PTFE can be formed into an end product which is free of variations in dimesions and shape and of cracks.

A completely calcined low-molecular-weight PTFE resin is nearly spherical in its particle shape, so that its specific surface area is small. Such a PTFE is best suited as an additive for a molten resin composition because such a PTFE is least likely to increase the viscosity of the composition.

Commercial versions of recycled PTFE powder include KT300M, KT300H, KT400M, KT400H, KTL610 and KTL8N, all made by KITAMURA LTD.

The content of PTFE powder in the composition is 18–30 wt %, preferably 20–25 wt %. If its content is less than 18 wt %, non-tackiness of the stripping finger will improve little. If over 30 wt %, the heat resistance and shock resistance of the stripping finger will drop. If the content is 20–25 wt %, non-tackiness, heat resistance and shock resistance of the stripping finger are particularly good.

The polyolefin resin used in this invention is a well-known polymer as a thermoplastic resin, and may be a polyethylene such as a low-density polyethylene, straight-chain, low-density polyethylene, medium-density polyethylene, high-density polyethylene or ultra-high-molecular-weight polyethylene, a polypropylene, or their mixture, copolymer or modification.

Like the PTFE, such polyolefin resins disperse uniformly in the PPS resin, improving non-tackiness of the composition. Thus, it is preferable to use a polyolefin high in dispersibility in the PPS resin and capable of improving the moldability of PPS.

The polyolefin resins used in this invention is not limited in its kind, but a high-density polyethylene having a specific gravity of 0.942 g/cm$^3$ or higher and lower than 1 g/cm$^3$, or 0.98 g/cm$^3$ is preferable.

The polyolefin resins should have a number-average molecular weight (Mn) of $3\times10^4$–$5\times10^6$, preferably $5\times10^4$–$3\times10^5$. If within such a range, compatibility with PPS resin and injection moldability would be good.

The polyolefin used in this invention is not limited in its melt flow rate (MFR)(as measured under ASTM, D1238 or JIS K-6760 (1995)) but preferably has an MFR of 0.1–150 g per 10 minutes, preferably 0.1–50 g/10 min, more preferably 0.3–30 g/10 min, because within this range, dispersion in the polyphenylenesulfide resin and concentration at the molding surface are good.

The content of the polyolefin is 2–7 wt %, preferably 3–6 wt %. If its content is less than 2 wt %, non-tackiness on the surface of the stripping finger will not improve sufficiently. If higher than 7 wt %, the melt moldability (especially injection moldability) of the composition will deteriorate. If the content of polyolefin is 3–6 wt %, especially good non-tackiness and moldability are attainable.

It is not necessary to provide a surface coating on the surface of the stripping finger according to the present invention by applying or baking e.g. a fluorine polymer. It is thus possible to provide stripping fingers that are high in productivity and low in cost. But according to the type of toner used in the copier, a coating of e.g. a fluorine polymer may be applied or baked.

Since the melt viscosity of polyolefin resin is lower than those of polyphenylene sulfide resin and polytetrafluoroethylene, molten polyolefin resin is pushed by the polyphenylene sulfide resin onto the surface of the stripping finger when the stripping finger is formed by injection molding. The thus formed stripping finger is high in the content of polyolefin resin near its surface. Thus, a polyolefin film is uniformly formed on the surface of the stripping finger. Since this film also contains polytetrafluoroethylene, the lubricity of the stripping finger improves greatly. Toner is thus less likely to adhere to such a stripping finger.

The fibrous reinforcing material used in this invention may be any known fibrous reinforcing material so long as it can reinforce the finger tip without impairing the paper stripping function of the stripping finger. Such fibrous reinforcing materials include carbon fiber, glass fiber, graphite fiber, stainless and other metal fibers, calcium silicate whisker, calcium carbonate whisker, calcium sulfate whisker, magnesium nitrate whisker, potassium titanate whisker, aluminum borate whisker, silicon carbide fiber, silicon nitride fiber, magnesium sulfate whisker, zinc oxide whisker, magnesia fiber, titanium oxide whisker, alumina fiber, Tyranno fiber, zirconia fiber, Xonotlite fiber, wollastonite whiskers and their mixture.

The fibrous reinforcing material used in this invention has preferably fiber diameters of 0.05–25 μm and fiber lengths of 1–5000 μm, more preferably fiber diameters in of 0.1–3 μm and fiber lengths of 1–700 μm. A reinforcing material having fiber diameters or lengths below the above range could hardly improve the wear resistance of the PPS resin composition and thus reinforce the composition. A reinforcing material having fiber diameters or lengths over the above range would increase the surface roughness, making it difficult to form an angular end with high precision.

A fibrous reinforcing material is preferable as the reinforcing material because it is high in flame retardancy and can improve the heat resistance and flame retardancy of the stripping finger, which is used in a high-temperature environment.

The fibrous reinforcing material according to this invention may be whiskers having a pH of 10 or less, preferably 4–9, more preferably 5–8. An extremely alkaline (over 10 in pH) or extremely acidic fibrous reinforcing material such as whiskers may destroy bond groups involved e.g. sulfide bonds of PPS or olefin bonds and C—H bonds of a polyolefin resin, thereby lowering the physical properties and dimensional accuracy of PPS and polyolefin resins. If whiskers having a pH outside of the predetermined range protrude from the substrate surface of the stripping finger, such whiskers will have bad influences on the stripping finger such as adhesion of toner on the surface.

Whiskers are needle-like monocrystals or polycrystals. Their preferable size is 0.1–1 μm in average fiber diameter and 1–10 μm in average fiber length. Their aspect ratio is 1–200, ordinarily 10–100.

The fibrous reinforcing material used in this invention may be glass fiber made from an inorganic glass containing such compounds as $SiO_2$, $B_2O_3$, $Al_2O_3$, CaO, ($Na_2O$), ($K_2O$), (MgO), ($Fe_2O_3$), etc.. Such an inorganic glass may be either a non-alkali glass (also called "E-glass" or "low-alkali glass"), or an alkaline glass (C-glass, A-glass). But a non-alkali glass is preferable because it is scarce, if any, in the alkali content, and thus scarcely changes the properties of the resin composition.

The non-alkali glass used in this invention may be a borosilicate glass containing about 52–56 wt % $SiO_2$, about 8–13 wt % $B_2O_3$, about 12–16 wt % $Al_2O_3$, and about 15–25 wt % CaO, or one further containing at least one of about 6 wt % or less MgO, and $Na_2O$ and $K_2O$ each 1 wt % or less. It has a tensile strength of e.g. about 300–400 kgf/mm$^2$, about 350 kgf/mm$^2$ on the average, and an elastic modulus of about 7400–7700 kgf/mm$^2$. It is excellent in all respects including tensile strength, elastic modulus, mass-productivity and cost.

If a non-alkali glass is used in this invention, such a non-alkali glass preferably has an average fiber length of about 10–700 μm, more preferably 10–300 μm, and an average fiber diameter of about 1–15 μm, more preferably about 3–8 μm. This is because glass fiber having a fiber diameter of over about 15 μm, or a fiber length of more than about 700 μm cannot disperse uniformly in a resin composition when mixed with the resin. Injection-molding of such a resin is difficult. Glass fiber having a fiber diameter of less than 1 μm or having a fiber length of less than 10 μm cannot increase the mechanical strength of the composition such as resistance to thermal deformation to a sufficiently high level.

If the fibrous reinforcing material used in this invention is potassium titanate whiskers, such whiskers may be ones represented by $K_2O.nTiO_2$ (n is a positive integer or a positive even number) such as $K_2O._6TiO_2$, $K_2O._6TiO_2.\frac{1}{2}H_2O$, $K_2Ti_2O_5$, $K_2Ti_4O_9$, $K_2Ti_6O_{13}$ and $K_2Ti_8O_{17}$. Such whiskers have a true specific gravity of 3.0–3.6, preferably 3.2–3.3, a melting point of 1300°–1400° C., a Mohs hardness of 3.5–4, and a pH of 7–9, and are manufactured by a flux or melt method.

In a flux method, a mixture of raw materials ($TiO_2$ and $K_2CO_3$) and a flux are melted at 1100°–1200° C., and cooled gradually to synthesize $K_2Ti_4O_9$ whiskers (primary compound). The whiskers obtained are treated in a dilute acid solution or boiling water to modify their composition by extracting part of K between layers. The thus modified whiskers are heat-treated at about 1000° C. to synthesize $K_2Ti_6O_{13}$ whiskers having a tunnel structure (secondary compound). The whiskers thus formed may be 0.1–0.5 μm in diameter and 1–50 μm long. Commercially available such whiskers include TISMO N, TISMO L and TISMO D made by OTSUKA CHEMICAL CO., LTD.

In a melt method, raw materials are mixed with $K_2Ti_2O_5$ in a stoichiometric composition ratio, and the mixture is melted at 1100°–1200° C., and the molten mixture is quickly cooled to synthesize a needle-like $K_2Ti_2O_5$ as primary compound. The whiskers obtained are treated to modify their composition and structure in the same manner as $K_2Ti_4O_9$ whiskers to synthesize $K_2Ti_6O_{13}$ whiskers (secondary compound). Whiskers formed by the melt method are larger in diameter than whiskers manufactured by the flux method. That is, such whiskers are typically 10–50 μm diameter and 80–500 long, or 0.5–10 μm in diameter and 10–50 μm long. Commercially available such whiskers include TXAS A, TXAS FA and TXAS B made by KUBOTA LTD.

Aluminum borate whiskers are white needle-like crystals represented by $9Al_2O_{3.2}B_2O_3$ or $_2Al_2O_3.B_2O_3$, and may be whitened by adding sulfur. Such aluminum borate whiskers have an average fiber diameter of 0.05–5 μm and an average fiber length of 1–100 μm, a Mohs hardness of 7–7.5, and a pH of 7–8.

Aluminum borate whiskers represented by $9Al_2O_{3.2}B_2O_3$ have a true specific gravity of 2.93–2.95, and a melting point of 1400°–1500° C. Such whiskers are manufactured by heating at least one of aluminum hydroxides and aluminum inorganic salts and at least one of oxides, oxyacids and alkali metal salts of boron to 900°–1200° C. in the presence of a melting agent comprising at least one of sulfates, chlorides and carbonates of alkali metals, thereby reacting and growing them.

Aluminum borate whiskers represented by $2Al_2O_{3.}B_2O_3$ have a true specific gravity of 2.92–2.94, and a melting point of 1000°–1100° C. Such whiskers are manufactured by heating the same materials and melting agent used to manufacture $9Al_2O_{3.}B_2O_3$ to 600°–1000° C. to react and grown them.

Preferable commercially available such aluminum borate whiskers include ALBOREX Y and ALBOREX G made by Shikoku Kasei Kogyo. Such whiskers have an average fiber diameter of 0.5–3μm, and an average fiber length of 1–50 μm.

Other whiskers that can be used in this invention include tetrapod-shaped zinc oxide whiskers (ZnO) that, containing impurities such as Pb or Cd, are yellow or gray in color, whiskers similar to the above whiskers but broken into conical or tapered shape, titanium oxide whiskers represented by $TiO_2$ in the form of rutile, white, needle-like crystals, and calcium carbonate whiskers.

The abovementioned zinc oxide whiskers can be manufactured by growing by vapor phase oxidation in a high-temperature (1000° C. or over), high-Zn-concentration (4% or over) environment while ZnO is being synthesized by vaporizing metallic zinc with a well-known industrial method (wet or dry). The thus obtained whiskers are grown in a c-axis direction with every four whiskers forming a tetrapod, i.e. extending from the body center of a regular tetrahedron to the respective four corners of the tetrahedron.

Tetrapod-shaped ZnO whiskers can be manufactured efficiently using a catalyst by a method comprising the steps of mixing zeolite (by 53% or less) as a catalyst into a mixture of metallic zinc powder (15–20%; 1–200 μm) having its surface oxidized, putting the mixture in a muffle furnace kept at a temperature of 900°–1000° C., closing the furnace, supplying air into the furnace at the rate of 3.5 liters per minute to grown whiskers by vapor phase oxidation. In this method, use of surface-oxidized metallic Zn powder makes it possible to suitably control oxidation reaction. The zeolite as catalyst prevents the formation of plate crystals, thus promoting the growth of whiskers.

Whiskers (ZnO) obtained in this method have a melting point of about 2000° C. Their lengths are 2 to 200 μm, about 100 μm on the average. Their average diameter is 0.2–3 μm and the average diameter at the central portion is 0.5–10 μm. Commercially available such tetrapod-shaped zinc oxide whiskers include PANATETRA made by Matsushita Electric Industires, Ltd.

In order to further improve the reinforcing effect of the resin composition by adding the above-described fibrous reinforcing material, the reinfocing material may be surface-treated with a coupling agent, which may be one in the family of silane, silicon, titanium, aluminum, zirconium, zirco-aluminum, chromium, boron, phosphorus, epoxy, amino acid, modified silicone oil, etc.

Whiskers in the resin composition are broken during pelletizing or molding, so that their average length decreases to less than 10 μm. According to the type of whiskers, their length can decrease to 1–5 μm. Such short whiskers will not impair smooth flow of resin during injection molding. This makes it possible to make the surface of the stripping finger extremely smooth, improve non-tackiness and dimensional accuracy, and prevent the formation of burrs at the tip and corners of the finger during molding.

In order to prevent the stripping finger according to this invention from damaging the sliding mating member, it is preferable to use a fibrous reinforcing material having a Mohs hardness of 1–10. If the Mohs hardness of the fibrous reinforcing material is below this range, it will be impossible to sufficiently reinforce the resin composition. If too high, the possibility of damaging the mating sliding member increases. For this reason, the fibrous reinforcing material preferably has a Mohs hardness of 3–9.

There are two Mohs hardness standards, a new and an old one. The Mohs hardness values shown in the specification of this invention are all given under the old standard. Any fibrous reinforcing materials having a Mohs hardness higher than 5 is judged to be a hard material, and one having a Mohs hardness of less than 5 are regarded as a soft material.

Whiskers having a hardness within the above range include potassium titanate whiskers, calcium carbonate whiskers, wollastonite whiskers, magnesium sulfate whiskers, aluminum borate whiskers and zinc oxide whiskers. Among them, potassium tatanium whiskers, aluminum borate whiskers and zinc oxide whiskers are especially preferable in fiber shape and mechanical strength.

The content of the fibrous reinforcing material used in this invention is 10–40 wt %, preferably 15–30 wt %, more preferably 15–25 wt %. If its content is less than 10 wt %, the stripping finger obtained will have not required heat resistance and shock resistance. If its content is higher than 40 wt %, the stripping finger obtained will have a rough surface, which not only impairs paper stripping and guiding functions, but its appearance will be bad.

Heat-resistant resins other than PPS resin may be added to the resin composition according to the present invention, provided such addition will not deteriorate the object of the invention. Such resin or resins may be thermoplastic or thermoset resins and may be epoxy resin, ester cyanate resin, phenolic resin, polyimide resin, silicone resin, polyester, polyamide, polyphenylene oxide, polycarbonate, polysulfone, polyetherketon, polyetherether keton, polyphenylene sulfide sulfone, polyphenylene sulfide keton, and their mixture.

To the PPS resin composition of the invention may be added powder filler such as calcium carbonate, mica, silica, talc, calcium sulfate, kaolin, clay, glass beads, glass powder, or their mixture, in an amount that may not deteriorate the object of the invention.

Other additives which can be added to the PPS resin composition of the invention in an amount that will not deteriorate the object of the invention include release agents, lubricants, heat stabilizers, antioxidants, UV absorbers, crystal nucleus agent, foaming agents, rust preventives, ion trapping agents, flame-retardants, flame-retarding assistants, colorants such as dyes and pigments, antistatic agents and their mixture.

Next, combustibility testing method under the UL specification (UL94) will be described. UL94 stipulates two combustibility tests, i.e. horizontal combustibility test 94HB and vertical combustibility test 94V. For incombustible materials, the latter test is usually applied. UL94V-0 is the most strict test standard. The resin composition for stripping fingers of this invention meets the V-0 standard and shows high safety.

The stripping fingers according to this invention may be manufactured by molding the above-described PPS resin composition by a known melt molding method. For example, such a method comprises the steps of mixing the raw materials in a blender such as a V-blender or a Henschel mixer, pelletizing the mixture by heating and melting by means of a kneader, a mill or a single- or twin-screw extruder with the cylinder temperature maintained higher than the melting point of the PPS resin (280°–290° C.) and lower than its decomposition point (about 400°–500° C.) and the screw speed at 30–60 rpm and molding with an injection molder with the injection pressure at 200–1000 kgf/cm$^2$ and the mold temperature at 125°–150° C.

After injection molding, the resin composition is kept heated at a temperature higher than the glass transition point of PPS resin (80°–95° C.) and lower than its melting point (280°–290° C.), specifically at 180°–260° C., preferably 200°–230° C. for 0.5–3 hours, a total of 1–24 hours, preferably 3–12 hours.

The surface shape and surface roughness should be as small as possible, at the roller cavity of the mold for injection-molding the roller, and at the portion of the roller where the roller is brought into rolling sliding contact with sheet members or the support shaft, to improve the release properties of the roller with respect to the mold.

Such surface shapes, surface roughnesses, shape roughnesses may be given in JIS-defined parameters such as Rmax (maximum roughness), Ra (arithmetic mean roughness) or Rz (ten-point mean roughness). They should be 25 μm or less, preferably 10 μm or less, more preferably 3.2 μm or less. If the surface roughness is over this value, sliding surfaces might be damaged and thus worn. Also, it becomes difficult to release paper discharge rollers from molds. This lowers production efficiency and yield. In order to cut the cavity surface of the mold for injection molding, the support shaft, and the paper discharge roller surface with high accuracy, the surface shape and roughness should be 0.1 μm or higher, preferably 1 μm or higher.

But considering the fact that it takes a long time to finish the surface of the mold for injection molding or the support shaft and possible influence on the formation of transfer resin film, the surface shape/roughness may be 2–8 μm, provided the roller is not affected by wear.

For the hardness of the stripping finger, it should have a Rockwell hardness (measured under ASTM D785) of R 80 or more, M 130 or less, preferably M 50 or more, M 110 or less. If the hardness is too low, the stripping finger may be worn by coming into sliding contact with OHP transfer members or transfer paper. If too high, the stripping finger tends to damage PPC paper and other OHP transfer members. The hardness of the stripping finger is adjustable to the above-described range by adding 1–50 weight % of various organic or reinforcing materials.

It is possible to determine the non-tackiness on the surface of stripping fingers by measuring the contact angle of waterdrops. If such contact angle is 80° or over, one can safely say that the resin molding is sufficiently non-tacky. Preferably, the contact angle is should be 90° or over.

Typically, the contact angle is determined by dropping 0.01–0.1 milliliter, preferably 0.05 milliliter, waterdrops on the surface of a test pieces at normal temperature and pressure and measuring their contact angle 30 seconds and a minute after the beginning of dropping by an automatic contact angle meter or a goniometer. But the contact angle may be measured in any other way.

The stripping finger is formed so that its tip R has a thickness 2/5–4/5 of the thickness of copy paper. Specifically, since copy paper has a thickness of about 100 µm or 60–75 µm, the tip R of the stripping finger should have a thickness of 100 µm or less or 5–60 µm, preferably 10–50 µm.

If stripping fingers have tips R thicker than copy paper sheets, such stripping fingers cannot strip copy paper smoothly, increasing the possibility of clogging (jamming) of paper. If the thickness of the tip R is below the predetermined range, the tip can be chipped easily. Moreover, to form such a thin tip, a extra step of precision cutting is necessary, which makes it difficult to manufacture stripping fingers efficiently. Also, much time is needed to maintain such a thin R shape with high accuracy, which can lead to an increase in manufacturing cost.

By injection molding, the tip R can be formed precisely and efficiently. Conventional stripping fingers made from a material mainly comprising PPS resin have to be subjected to tumbling treatment (barrel polishing) after injection molding to improve the geometric accuracy. By using the resin composition according to this invention, it is possible to eliminate the polishing step after injection molding. The stripping finger can thus be manufactured at a low cost. But if necessary, tumbling may be used. At that time, the angle at the tip of the stripping finger should be 10°–45°, preferably 15°–30° C.

The stripping fingers according to this invention can also be used with various types of printers in which record patterns are formed on recording media such as photosensitive materials by use of external electric signals, and the electrically recorded patterns are converted to visible patterns.

Such printers include electrophotographic printers, ink-jet printers, thermosensitive printers, photoprinters and electronic recording printers. Electrophotographic printing methods include Carlson method, light-charge injection method, light polarizing method, photoelectromotive force method, charge-transfer method, electrolytic electrophotographic method, electrostatic latent image photographic method, light-electrophoresis and thermoplastic method. Photoprinters include laser printers, LED (light emitting diode) printers, liquid crystal shutter printers and CRT printers. Electronic recording methods include electrostatic recording type, electrothermo-recording type, electrolytic recording type and electrical discharge recording type.

Figure 4:
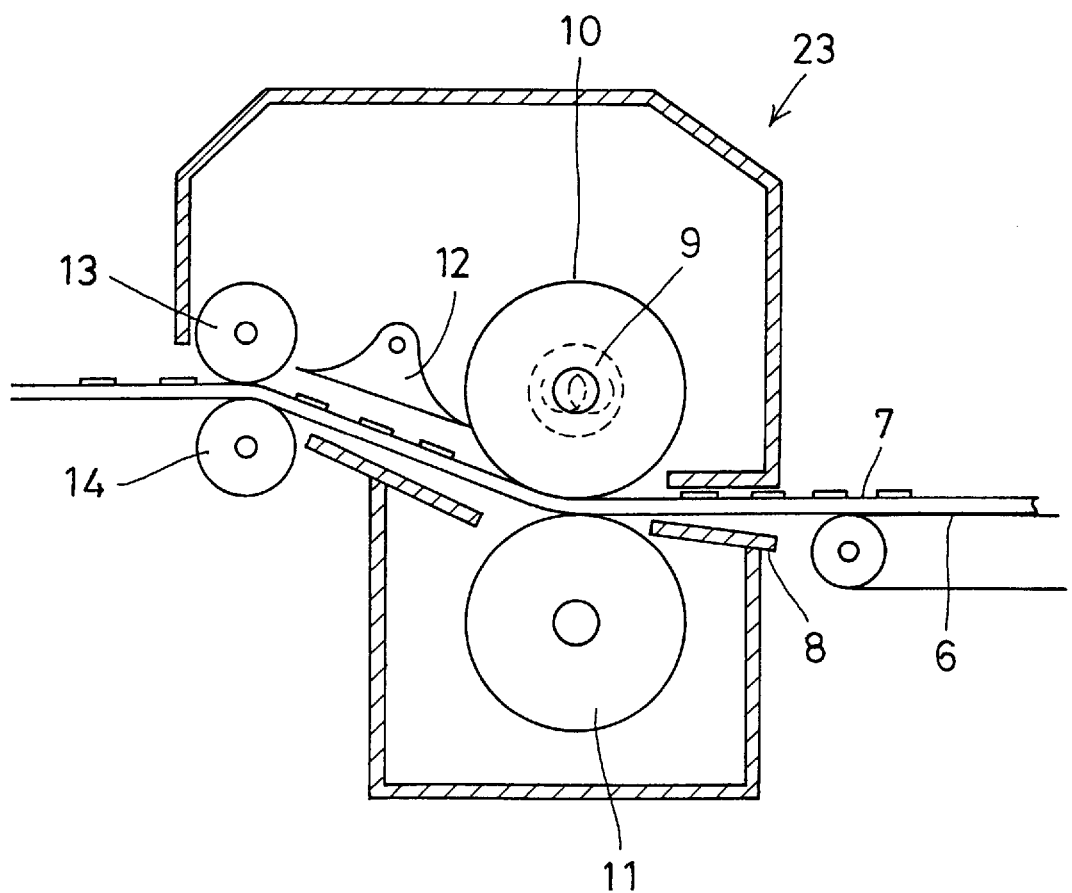
FIG. 4 is a sectional view of a fixing device.
Figure 5:
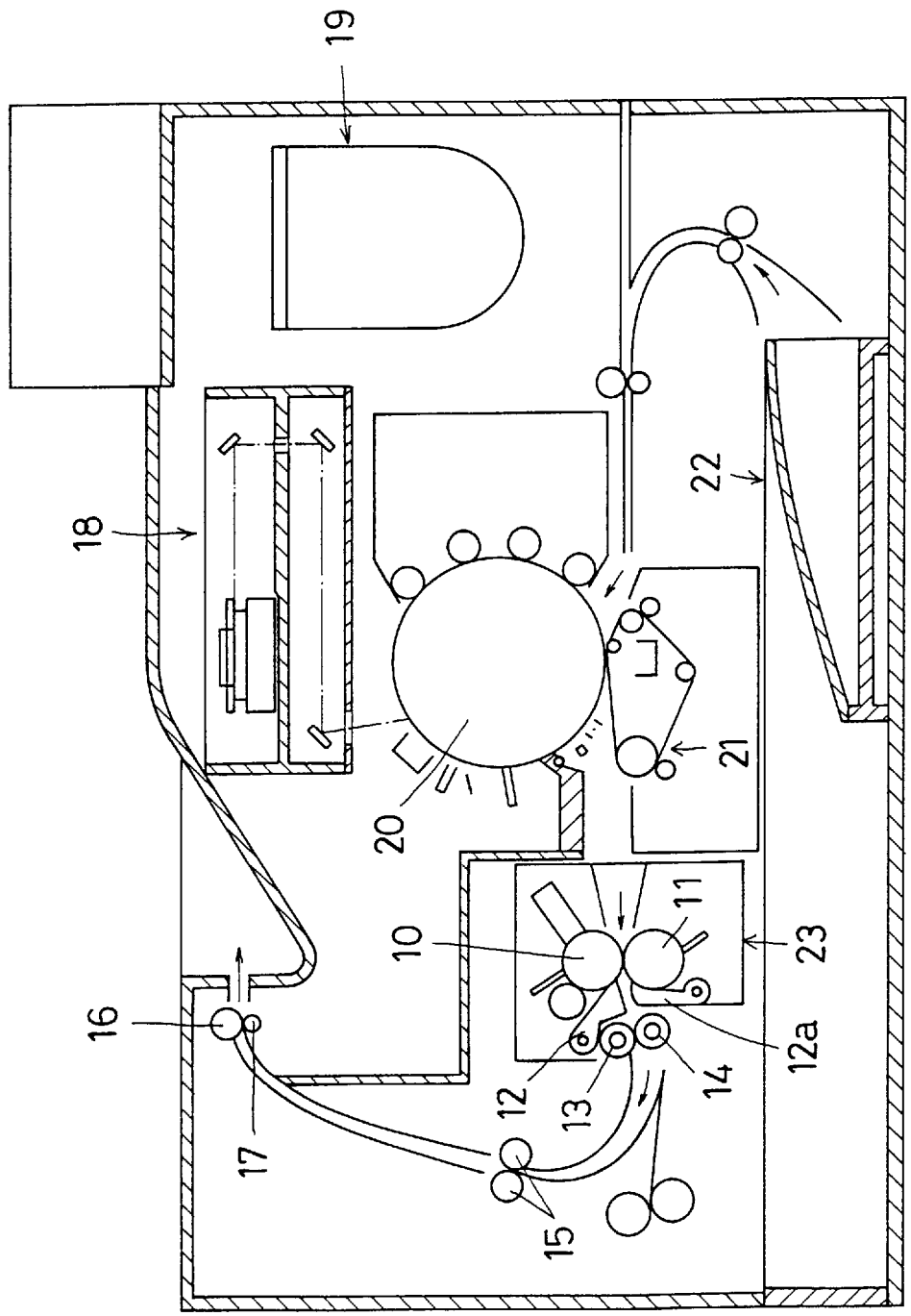
FIG. 5 is a sectional view of a fixing unit of a color laser printer.

Specifically, the term "copier" refers to image forming devices in general including toner image transfer type dry or wet static copiers (PPC, shown in FIG. 4) laser beam printers (LBP, shown in FIG. 5), liquid crystal shutter (LCD) printers or facsimile printers such as plain paper copy (PPC), light-emitting diode (LED), or silver-salt photographic (CRT) printers.

The stripping finger according to this invention may be used not only in the paper feed unit, photosensitive unit, image fixing unit or paper discharge unit of a copier, but may be used with the rollers in the image fixing unit such as fixing rollers or pressure rollers if a highly heat-resistant resin is selected. The stripping finger according to this invention is especially suited for use with a fixing roller, which is subjected to extremely severe heat conditions. Also, this stripping finger can be used near the discharge end of a fixing roller in the image fixing unit of a dry static copier, which is used at a higher temperature than the pressure roller in the fixing unit, and which is required to be lower in non-tackiness to toner than rollers used in a wet static pressure, in which the adhesion of toner is prevented by applying oil.

[EXAMPLES]

The material used in Examples and Controls are shown below.

(1) polyphenylene sulfide resin (made by TOSOH SUSTEEL CO., LTD.: PPS, 2000 poise in melt viscosity at 315° C.)

(2) polyphenylene sulfide resin (made by TOSOH SUSTEEL CO., LTD.: PPS, 5000 poise in melt viscosity at 315° C.)

(3) polyphenylene sulfide resin (made by TOSOH SUSTEEL CO., LTD.: PPS, 7000 poise in melt viscosity at 315° C.)

(4) polyphenylene sulfide resin (made by TOSOH SUSTEEL CO., LTD.: PPS, 24000 poise in melt viscosity at 315° C.)

(5) polytetrafluoroethylene (PTFE, 3 µm in average particle diameter)

(6) polytetrafluoroethylene (PTFE, 7 µm in average particle diameter)

(7) polytetrafluoroethylene (PTFE, 0.3 µm in average particle diameter)

(8) polyolefin; high-density polyethylene (HDPE ①, MFR= 20 g/10 minutes, specific gravity=0.954 g/cm$^3$)

(9) polyolefin; high-density polyethylene (HDPE ②, MFR= 0.35 g/10 minutes, specific gravity=0.954 g/cm$^3$)

(10) polyolefin; low-density polyethylene (LDPE ①, MFR=0.3 g/10 minutes, specific gravity=0.920 g/cm$^3$)

(11) polyolefin; low-density polyethylene (LDPE ②, MFR= 100 g/10 minutes, specific gravity=0.914)

(12) polyolefin; polypropylene (PP, MFR=5 g/10 minutes, specific gravity=0.900)

(13) glass fiber (GF ①, 6.5 µm in average fiber diameter, chopped strands of 3 mm cut length)

(14) glass fiber (GF ②, 13 µm in average fiber diameter, chopped strands of 3 mm cut length)

(15) potassium titanate whisker (whisker ①, average fiber diameter: 0.2–0.5 µm, average fiber length: 5–25 µm, Moh's hardness: 3.5–4, pH 7–9, TISMO N made by OHTSUKA CHEMICAL CO., LTD.)

(16) aluminum borate whisker (whisker ②, average fiber diameter: 1–3 µm, average fiber length: 5–35 µm, Moh's hardness: 7–7.5, pH 7–8, ALBOREX Y made by SHIKOKU KASEI CO., LTD.)

(17) zinc oxide whisker (whisker ③, average fiber diameter: 0.5–3.0 µm, average fiber length: 5–150 µm, pH 7, PANATETRA made by MATSUSHITA ELECTRIC INDUSTRIES, LTD.)

(18) titanium oxide whisker (whisker ④, average fiber diameter: 0.1–0.2 µm, average fiber length: 0.5–3 µm, Moh's hardness: 7–7.5, pH 6–8, FTL100 made by ISHIHARA SANGYO CO., LTD.)

(19) calcium carbonate whisker (whisker ⑤, average fiber diameter: 0.5–1.0 µm, average fiber length: 10–30 µm, Moh's hardness: 3.5–4, pH 9.5, WHISKAR made by MARUO CALCIUM CO., LTD.)

The average particle diameters of the above PTFE's were 50% of the particle diameters as measured by a particle diameter meter MICROTRACK HRA by NIKKISO CO., LTD. (laser analysis).

[Examples 1–13 and Controls 1–11]

Raw materials were added in the amounts shown in Table 1, mixed together, and pelletized by kneading while melting with a twin-screw extruder at a cylinder temperature of 290°–320° C. and a screw speed of 50 rpm. The pellets were supplied into an injection molder, and molded under normal conditions (cylinder temperature: 310°–340° C., injection pressure: 300–800 kgf/cm², mold temperature: 130° C.) into test pieces of the same shape as stripping fingers used in Fuji Xerox dry static copier Type 2700 (3 mm in thickness and width with a tip having radius of curvature R=0.04 mm, surface roughness: 2–3 μm Ra) The test pieces were heat-treated for 8–10 hours (kept at 230° C. for two hours).

The test pieces obtained were subjected to the following tests (a)–(d) to measure the heat resistance (deformation) at the finger tips, shock resistance and contact angle at the finger tips, and moldability.

(a) Heat resistance

Figure 2:
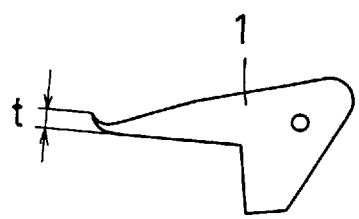
FIG. 2 is a side view of a stripping finger showing the amount of deformation at its tip.

Each test piece 1 was mounted on the free end of an arm 2 of a finger tip thermal deformation tester (schematically shown in FIG. 1). With a weight 3 attached to the arm 2 to apply a 20 g load to the tip of the test piece 1, the tip was pressed against the surface of an aluminum roller 4 so that the contact angle θ was 100°. The surface of the roller 4 was heated to 250° C. with a heater mounted in the roller. After each test piece was pressed against the roller for 20 seconds in this state, the amount of deformation (t in FIG. 2) at finger tip was measured. The amounts of deformation (in μm) in Table 2 are each the average of 10 test pieces. If the average is 40 μm or less, the deformation was judged small. The arm 2 was vertically pivotally mounted on a shaft 5.

(b) Shock resistance at finger tip

Figure 3:
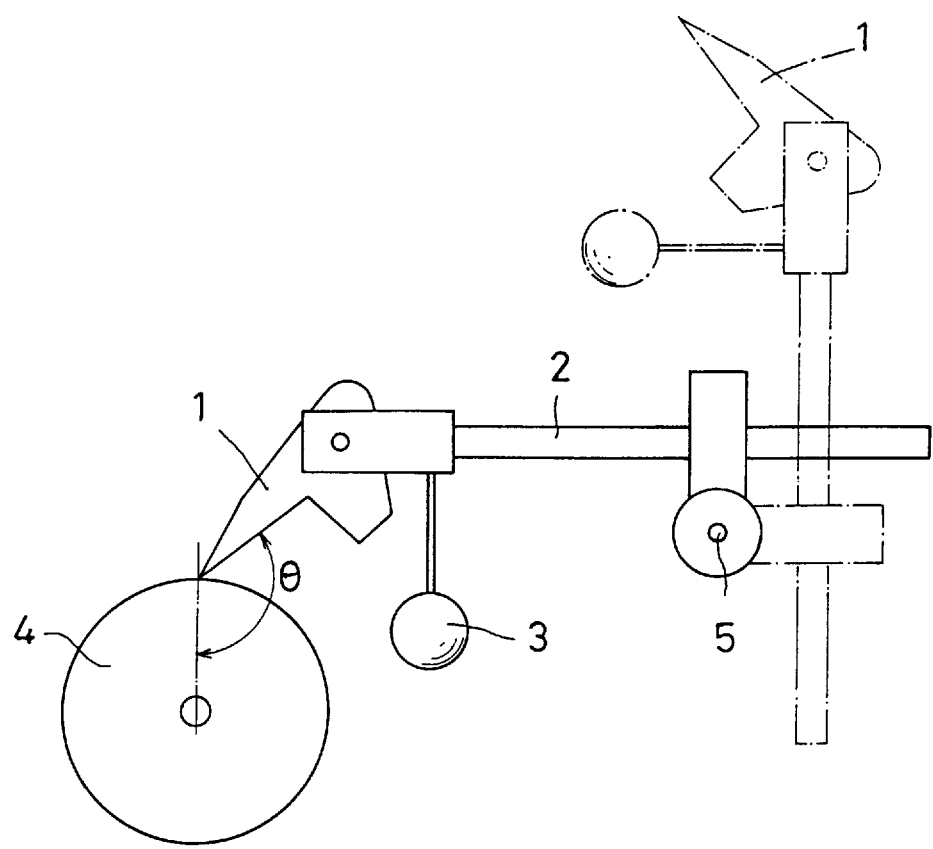
FIG. 3 is a schematic side view of a shock tester for measuring the shock applied to the tip of a stripping finger.

Each test piece 1 was mounted on a finger tip shock resistance tester (which is structurally the same as the thermal deformation tester shown in FIG. 1) as shown in FIG. 3, with a weight 3 attached to the arm 2 so that a load of 20 g would be applied to the tip of the test piece when the arm was stationary in the horizontal position (shown by solid line in FIG. 3). From the vertical position (shown by chain line in FIG. 3), the arm was released to let the finger tip collide with the surface of the roller 4. This was repeated 10 times for each test piece, and the degree of damage to the tip of each test piece was observed by the naked eye. The test results are indicated in Table 2 in which the mark ◯ means that damage or cracks were not observed, and the mark X means that damage or cracks were observed.

(c) Contact angle

The surface of each test piece was washed with acetone and the contact angle of ion exchange water was measured with an automatic contact angle meter (KYOWA INTERFACE SCIENCE CO., LTD.). The results are shown in Table 2. If the contact angle is 95° C. or more, the test piece was judged good. If 95° C. or less, judged bad.

(d) Moldability

Each test piece was observed when injection-molded to check if molten resin drooled out of the cylinder during injection molding. The mark X1 in Table 2 indicates that drooling occurred. The mark X2 indicates that the appearance of the test piece was no good. The mark ◯ indicates that the test piece was free of any problems.

As will be apparent from the compositions shown in Table 1 and the results shown in Table 2, Controls 1 and 6, which contained no or scarce amount of PTFE, were inferior in non-tackiness. Control 2, which was too large in particle diameter of PTFE and which contains no glass fiber, was low both in heat resistance and shock resistance, and inferior in non-tackiness. Control 3, which was too large in particle size of PTFE and contained no polyolofin resin was poor in non-tackiness.

Drooling was observed in Control 4, which contained PPS having a melt viscosity not within the predetermined range, and in Control 9, which contained excessive polyolefin. Control 5, which contained insufficient amount of PPS resin and excessive PTFE, was inferior in heat resistance and shock resistance.

For Controls 7 and 10, which were too large in particle diameter of PTFE, and Control 8, which was too small in particle diameter of PTFE, non-tackiness was inferior. Control 11, which was too small in content of PPS resin and was too large in particle size of PTFE, was poor in non-tackiness and the appearance of the test piece was ugly.

Examples 1–13, which satisfied all the prescribed requirements, showed good non-tackiness, as evidenced by the fact that they all should contact angles greater than 96°. They were also excellent in moldability as well as heat resistance and shock resistance at tips.

The test pieces of the same composition as the Examples were prepared and tested for imflamability (under UL94). The Examples satisfied V-O specification.

The stripping finger for a copier according to this invention has a tip which is acutely arcuated with extremely high precision, is less likely to be deformed when heated or collided repeatedly with a roller, so that it can maintain high paper stripping ability for a long time. Its lubricity and non-tackiness at the surface are also maintained stably for a long time.

By using a polyphenylene sulfide resin having the specific melt viscosity, it is possible to shape the tip of the finger with an acute and accurate curvature by injection molding, while maintaining the abovementioned advantages.

TABLE 1

| | PPS resin | | PTFE | | Polyolefin | | | Fibrous inorganic filler | |
|---|---|---|---|---|---|---|---|---|---|
| | Melt viscosity (poise) | Content (Wt %) | 50% particle dia (μm) | Content (Wt %) | Type | MFR (g/10 min.) | Content (Wt %) | Type | Average fiber dia. (μm) | Content (Wt %) |
| Example 1 | 5000 | 54.5 | 3 | 22.5 | HDPE① | 20 | 5.5 | GF① | 6.5 | 17.5 |

TABLE 1-continued

| | PPS resin Melt viscosity (poise) | PPS resin Content (Wt %) | PTFE 50% particle dia (μm) | PTFE Content (Wt %) | Polyolefin Type | Polyolefin MFR (g/10 min.) | Polyolefin Content (Wt %) | Fibrous inorganic filler Type | Fibrous inorganic filler Average fiber dia. (μm) | Fibrous inorganic filler Content (Wt %) |
|---|---|---|---|---|---|---|---|---|---|---|
| Example 2 | 24000 | 54.5 | 3 | 22.5 | HDPE① | 20 | 5.5 | GF① | 6.5 | 17.5 |
| Example 3 | 7000 | 57.0 | 3 | 22.5 | HDPE① | 20 | 3 | GF① | 6.5 | 17.5 |
| Example 4 | 5000 | 54.5 | 3 | 22.5 | HDPE 2 | 0.35 | 5.5 | GF① | 6.5 | 17.5 |
| Example 5 | 5000 | 54.5 | 3 | 22.5 | LDPE 1 | 0.3 | 5.5 | GF① | 6.5 | 17.5 |
| Example 6 | 5000 | 54.5 | 3 | 22.5 | LDPE 2 | 100 | 5.5 | GF① | 6.5 | 17.5 |
| Example 7 | 5000 | 54.5 | 3 | 22.5 | PP | 5 | 5.5 | GF① | 6.5 | 17.5 |
| Example 8 | 5000 | 54.5 | 3 | 22.5 | HDPE① | 20 | 5.5 | GF 2 | 13 | 17.5 |
| Control 1 | 7000 | 68.0 | — | — | HDPE① | 20 | 2 | GF① | 6.5 | 30.0 |
| Control 2 | 5000 | 68.0 | 7 | 30.0 | HDPE① | 20 | 2 | — | — | — |
| Control 3 | 5000 | 50.0 | 7 | 30.0 | — | — | — | GF① | 6.5 | 20.0 |
| Control 4 | 2000 | 54.5 | 3 | 22.5 | HDPE① | 20 | 5.5 | GF① | 6.5 | 17.5 |
| Control 5 | 5000 | 31.0 | 3 | 45.0 | HDPE① | 20 | 5.5 | GF① | 6.5 | 17.5 |
| Control 6 | 5000 | 53.0 | 3 | 15.0 | HDPE① | 20 | 2 | GF① | 6.5 | 30.0 |
| Control 7 | 5000 | 52.0 | 7 | 22.5 | HDPE① | 20 | 5.5 | GF① | 6.5 | 20.0 |
| Control 8 | 5000 | 54.5 | 0.3 | 22.5 | HDPE① | 20 | 5.5 | GF① | 6.5 | 17.5 |
| Control 9 | 5000 | 50.0 | 7 | 20.0 | HDPE① | 20 | 10 | GF① | 6.5 | 20.0 |
| Control 10 | 5000 | 64.0 | 7 | 20.0 | HDPE① | 20 | 1 | GF① | 6.5 | 15.0 |
| Control 11 | 5000 | 33.0 | 7 | 20.0 | HDPE① | 20 | 2 | GF① | 6.5 | 45.0 |

TABLE 2

| | (a) Heat resistance Amount of deformation (μm) | (b) Shock resistance | (c) Contact angle (°) | Moldability judgement |
|---|---|---|---|---|
| Example 1 | 32 | ○ | 98 | ○ |
| Example 2 | 28 | ○ | 96 | ○ |
| Example 3 | 26 | ○ | 97 | ○ |
| Example 4 | 31 | ○ | 96 | ○ |
| Example 5 | 32 | ○ | 98 | ○ |
| Example 6 | 28 | ○ | 99 | ○ |
| Example 7 | 30 | ○ | 98 | ○ |
| Example 8 | 25 | ○ | 98 | ○ |
| Control 1 | 27 | ○ | 86 | ○ |
| Control 2 | 103 | × | 87 | ○ |
| Control 3 | 35 | ○ | 91 | ○ |
| Control 4 | 55 | ○ | 98 | ×₁ |
| Control 5 | 48 | × | 98 | ○ |
| Control 6 | 29 | ○ | 92 | ○ |
| Control 7 | 31 | ○ | 91 | ○ |
| Control 8 | 35 | ○ | 88 | ○ |
| Control 9 | 42 | ○ | 96 | ×₁ |
| Control 10 | 35 | ○ | 89 | ○ |
| Control 11 | 22 | ○ | 91 | ×₂ |

×₁: Drooling observe
×₂: Poor appearance

TABLE 3

| | PPS resin Melt viscosity (poise) | PPS resin Content (Wt %) | PTFE 50% particle dia (μm) | PTFE Content (Wt %) | Polyolefin resin Type | Polyolefin resin MFR (g/10 min.) | Polyolefin resin Content (Wt %) | Fibrous inorganic filler Type | Fibrous inorganic filler Average fiber dia. (μm) | Fibrous inorganic filler Content (Wt %) |
|---|---|---|---|---|---|---|---|---|---|---|
| Example 9 | 5000 | 54.5 | 3 | 22.5 | HDPE① | 20 | 5.5 | whisker① | 0.3 | 17.5 |
| Example 10 | 5000 | 54.5 | 3 | 22.5 | HDPE① | 20 | 5.5 | whisker② | 2.0 | 17.5 |

TABLE 3-continued

| | PPS resin | | PTFE 50% particle | | Polyolefin resin | | | Fibrous inorganic filler | Average fiber | |
|---|---|---|---|---|---|---|---|---|---|---|
| | Melt viscosity (poise) | Content (Wt %) | dia (μm) | Content (Wt %) | Type | MFR (g/10 min.) | Content (Wt %) | Type | dia. (μm) | Content (Wt %) |
| Example 11 | 5000 | 54.5 | 3 | 22.5 | HDPE① | 20 | 5.5 | whisker③ | 1.0 | 17.5 |
| Example 12 | 5000 | 54.5 | 3 | 22.5 | HDPE① | 20 | 5.5 | whisker④ | 0.13 | 17.5 |
| Example 13 | 5000 | 54.5 | 3 | 22.5 | HDPE① | 20 | 5.5 | whisker⑤ | 0.7 | 17.5 |

TABLE 4

| | (a) Heat resistance Amount of deformation (μm) | (b) Shock resistance | (c) Contact angle (°) | (d) Moldability judgement |
|---|---|---|---|---|
| Example 9 | 35 | ○ | 100 | ○ |
| Example 10 | 29 | ○ | 99 | ○ |
| Example 11 | 32 | ○ | 100 | ○ |
| Example 12 | 30 | ○ | 98 | ○ |
| Example 13 | 35 | ○ | 98 | ○ |

What is claimed is:

1. A stripping finger molded from a polyphenylene sulfide resin composition comprising 40–70 wt % of a polyphenylene sulfide resin, 18–30 wt % of polytetrafluoroethylene powder having an average particle diameter of 1–5 μm, 2–7 wt % of a polyolefin resin, and 10–40 wt % of a fibrous reinforcing material.

2. A stripping finger as claimed in claim 1 wherein said polyphenylene sulfide resin has a melt viscosity at 315° C. of 3000 poise or over.

3. A stripping finger as claimed in claim 1 wherein said polyolefin resin is a polyethylene resin.

4. A stripping finger as claimed in claim 3 wherein said polyethylene resin is a high-density polyethylene resin.

5. A stripping finger as claimed in claim 3 wherein said polyethylene resin is a low-density polyethylene resin.

6. A stripping finger as claimed in claim 1 wherein said polyolefin resin is a polypropylene resin.

7. A stripping finger as claimed in claim 1 wherein said fibrous reinforcing material is glass fiber.

8. A stripping finger as claimed in claim 1 wherein said fibrous reinforcing material is potassium titanate whiskers.

9. A stripping finger as claimed in claim 1 wherein said fibrous reinforcing material is aluminum borate whiskers.

10. A stripping finger as claimed in claim 1 wherein said fibrous reinforcing material is zinc oxide whiskers.

11. A stripping finger as claimed in claim 1 wherein said fibrous reinforcing material is titanium oxide whiskers.

12. A stripping finger as claimed in claim 1 wherein said fibrous reinforcing material is calcium carbonate whiskers.

13. A stripping finger as claimed in claim 1 wherein near the surface of said stripping finger, the said polyolefin resin is richer than said polyphenylene sulfide resin.

14. A stripping finger as claimed in claim 1 which is used in a copying machine or a printer.

15. A stripping finger as claimed in claim 1 which is used for an image fixing unit in a copying machine or a printer.

16. A stripping finger as claimed in claim 1 which is used for an image fixing roller or a pressure roller in a copying machine or a printer.

* * * * *